United States Patent
Li et al.

(10) Patent No.: US 7,512,148 B2
(45) Date of Patent: Mar. 31, 2009

(54) WEIGHTED ROUND-ROBIN ARBITRATOR

(75) Inventors: Stephen Li, Plano, TX (US); Brian Tse Deng, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 759 days.

(21) Appl. No.: 10/731,810

(22) Filed: Dec. 9, 2003

(65) Prior Publication Data

US 2005/0122982 A1    Jun. 9, 2005

(51) Int. Cl.
*H04J 3/02* (2006.01)
(52) U.S. Cl. .................... 370/462; 370/412; 370/415; 370/417
(58) Field of Classification Search .............. 370/395.4, 370/229, 236, 395, 418
See application file for complete search history.

(56) References Cited

U.S. PATENT DOCUMENTS

| | | | | |
|---|---|---|---|---|
| 4,623,996 A | * | 11/1986 | McMillen | 370/418 |
| 5,555,405 A | * | 9/1996 | Griesmer et al. | 707/205 |
| 5,875,309 A | * | 2/1999 | Itkowsky et al. | 710/113 |
| 6,311,249 B1 | * | 10/2001 | Min et al. | 710/111 |
| 6,389,019 B1 | * | 5/2002 | Fan et al. | 370/395.42 |
| 6,430,152 B1 | * | 8/2002 | Jones et al. | 370/229 |
| 6,954,812 B2 | * | 10/2005 | Lavigne | 710/243 |

* cited by examiner

*Primary Examiner*—Hassan Kizou
*Assistant Examiner*—Emmanuel Maglo
(74) *Attorney, Agent, or Firm*—William B. Kempler; Frederick J. Telecky, Jr.; Wade J. Brady, III

(57) ABSTRACT

A weighted round-robin arbitrator for a plurality of data queue includes an arbitration table comprising a plurality of entries. Each entry represents a time slot for the transmission of one data packet from a selected one of the plurality of data queues. There is one arbitration logic circuit for each of the plurality of entries in the arbitration table. Each arbitration logic circuit includes a first multiplexer receiving an output from a first table entry and an output from a second table entry in the arbitration table. A second multiplexer receives empty flags from each of the data queues, the flags indicating that there is no data to the sent from that queue. An output of the second multiplexer is coupled to a control input of the first multiplexer so that the first table entry value is output from the first multiplexer if the corresponding queue has data to be sent out and the second table entry value is sent out from the first multiplexer if the queue corresponding to that table entry has data to be sent out and the queue corresponding to the first entry has no data to be sent out.

21 Claims, 2 Drawing Sheets

US 7,512,148 B2

WEIGHTED ROUND-ROBIN ARBITRATOR

FIELD OF THE INVENTION

This application is related to U.S. application Ser. No. 10/731,743 filed on even date and, entitled "PCI Express Switch", which is incorporated herein by reference.

This invention relates to a weighted round-robin arbitrator and more specifically to a weighted round-robin arbitrator for a PCI-Express fabric.

BACKGROUND OF THE INVENTION

Peripheral Component Interconnect (PCI) is a parallel bus architecture developed in 1992 which has become the predominant local bus for personal computers and similar platforms. The implementation of this technology has come close to its practical limits of performance and can not easily be scaled up in frequency or down in voltage. A new architecture utilizing point-to-point transmission, having a higher speed, and which is scalable for future improvements, is known as PCI Express.

The preferred technique for port arbitration between virtual channels (VC) in PCI Express is a weighted round-robin arbitrator. The advantage of the weighted round-robin arbitrator over a non-weighted round-robin arbitrator is that it is still possible to provide priority to one or more of the channels while guaranteeing that the channel having the least priority will still have access to the network. It is common in a weighted round-robin network to utilize a table having a predetermined number of time slots which are then allocated to the various channels that are vying for access to the network. PCI Express, for example, typically used between 32 and 256 time slots. Priority is given to a particular channel by providing it with more of the time slots than other channels, for example, the highest priority channel might receive half of the time slots whereas the remainder of the time slots are divided amongst lower priority channels. Each channel must receive at least a single time slot so that it is guaranteed access to the network. The assigned time slots can be contiguous or non-contiguous, depending upon the needs of a particular system, and this is usually assigned via a software routine.

FIG. 1 illustrates a known weighted round-robin arbitrator generally shown as 100. In this technique, after a packet of data has been sent out, a signal on line 102 advances the 3 bit counter 104 which address a look-up table 120. A 3 bit counter can address up to 8 entries in the look-up table. The output of the look-up table is a queue select signal on line 122 which is input into multiplexers 108, 124 and 128. Multiplexer 108 receives 3 empty flags 114, 116, 118 from queues 0, 1 and 2 respectively. The queue select signal on line 122 selects the queue matching the entry in the look-up table 120. If the selected queue has data to be sent out, the empty flag will show that that particular queue is not empty. The signal POP on line 130 will be multiplexed via multiplexer 128 onto the line 132, 134 or 136, depending on whether queue 142, 140 or 138 respectively, has been selected. On each POP signal, a bit will be transmitted from the queue via multiplexer 124 to the queue output data line 126. If there are 16 bits to a packet, for example, then 16 POP signals will be utilized to produce the 16 bits that is to be transmitted as a packet. If the selected flag indicates that the particular queue which has been selected is empty, the 3 bit counter 104 will continue to be advanced by the signal 102 to generate a different output to access the next entry in look-up table 120. This will continue until a queue having data to be sent out is found. If all the flags 114, 116, 118 show that all queues are empty AND gate 110 will generate a empty signal on line 112 to indicate to the system controller that there is no data to be sent out. Data is loaded into the queues 138, 140, 142 via lines 144, 146 and 148 respectively.

The system shown in FIG. 1 works quite well when there is data in the queue ready to be sent out. Unfortunately, in real life, often a queue will not have data that is ready to be sent out. In the system shown in FIG. 1, it takes the entire clock cycle to reach this determination. Thus, if no data is ready to be sent out from the selected queue, the time slot is lost. Each time the signal 102 changes only a single queue will be assessed for data to be sent out. If the same queue number is utilized in a series of contiguous time slots or the queues assigned to a series of contiguous time slots all contain no data to be sent out, then it will take a considerable amount of time to reach a time slot assigned to a queue that does have data to be sent out, which time is irretrievably lost. For example if channel Ø (queue Ø) has data to be sent out but it is the lowest priority channel having only a single time slot in a 256 slot table, and all other queues do not have data to be sent out, then data will only be sent out once in 256 transitions of the signal 102. This means that 255 of the 256 time slots are wasted and the data from channel Ø will be unnecessarily delayed. Accordingly, there is a need for a weighted round-robin arbitrator that will not waste the time slot when the selected queue is empty.

SUMMARY OF THE INVENTION

It is a general object of the invention to provide a weighted round-robin arbitrator that can select the next highest priority queue that has data to be sent out.

This and other objects and features are provided, in accordance with one aspect of the invention by a weighted round-robin arbitrator comprising a plurality of data queues. An arbitration table comprises a plurality of entries, each entry representing a time slot for the transmission of one data packet from a selected one of the plurality of data queues. An arbitration logic circuit, there being one such circuit for each of the plurality of entries in the arbitration circuit, comprises a first multiplexer receiving an output from a first table entry and an output from a second table entry in the arbitration table. A second multiplexer receives empty flags from each of the data queues, the flags indicating that there is no data to the sent from that queue, an output of the second multiplexer being coupled to a control input of the first multiplexer whereby the first table entry value is output from the first multiplexer if the corresponding queue has data to be sent out and the second table entry value is sent out from the first multiplexer if the queue corresponding to that table entry has data to be sent out and the queue corresponding to the first entry has no data to be sent out.

Another aspect of the invention includes a method of weighted round-robin arbitration comprising determining if a data queue corresponding to a first table entry in an arbitration table has data to be sent out. Sending out the data in the first entry if data to be sent out is present. If no data to be sent out is present in the data queue corresponding to the first entry, determined if data in a data queue corresponding to a second entry is ready to be sent out. Sending out the data in the second entry if data to be sent out is present.

DETAILED DESCRIPTION OF THE PRESENT INVENTION

Figure 1:
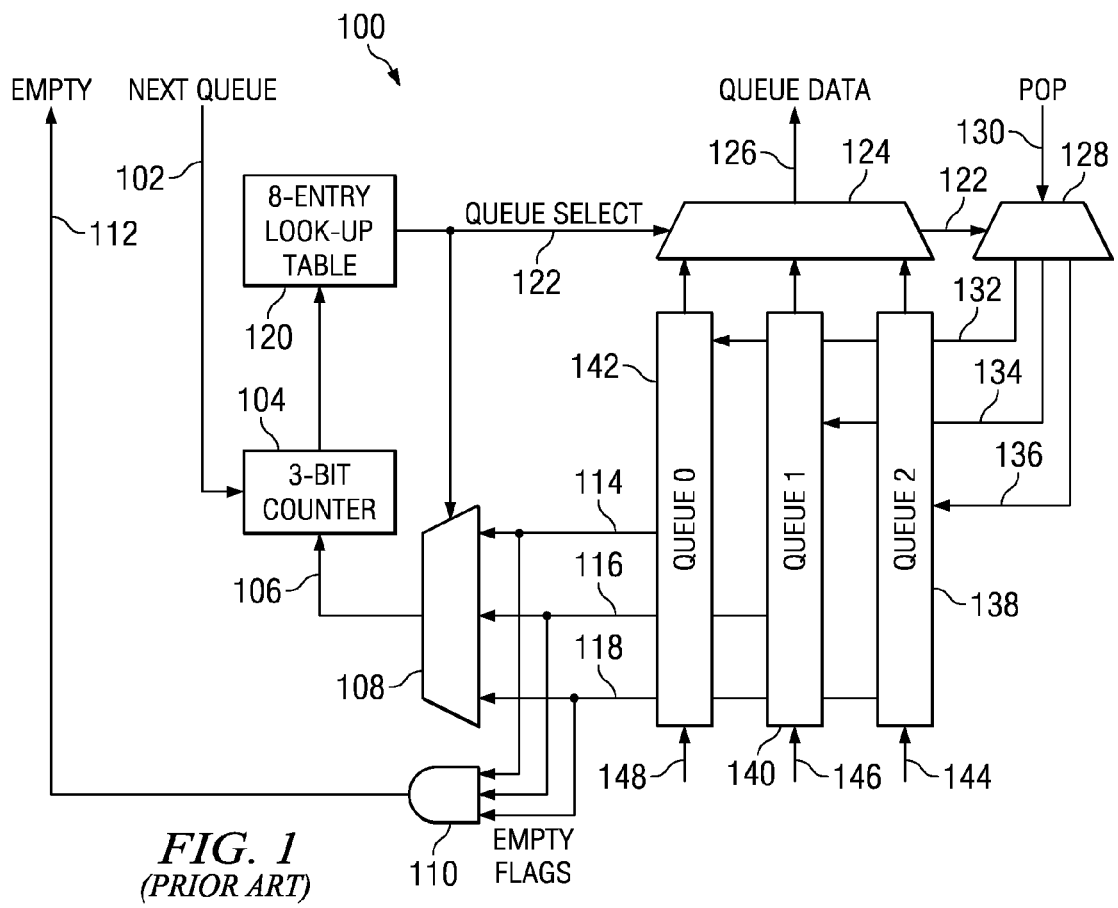
FIG. 1 is a block diagram of a know weighted round-robin arbitrator.
Figure 2:
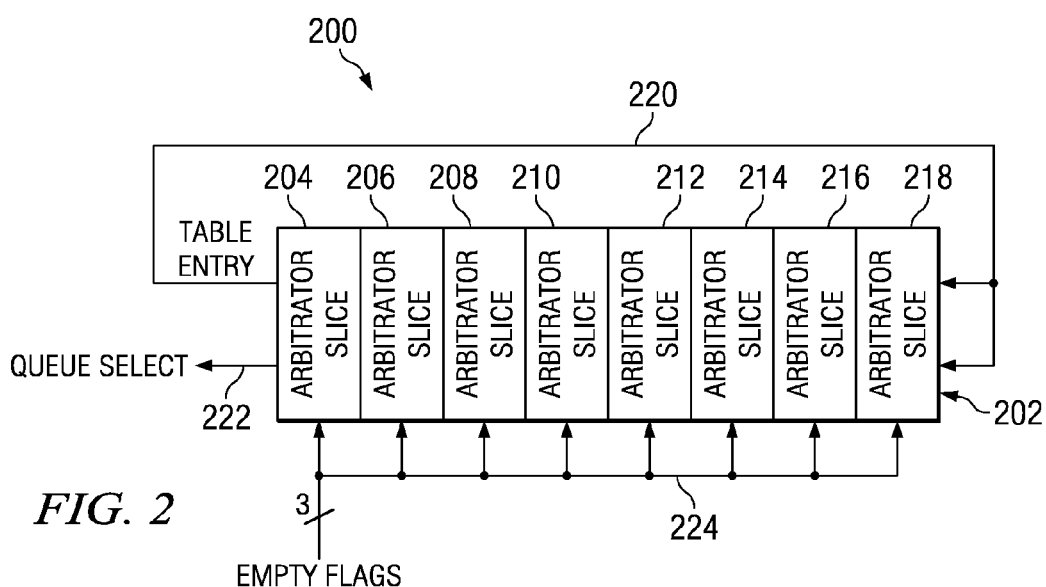
FIG. 2 is a block diagram illustrating the concept of the present invention.

Referring to FIG. 2, a block diagram of a system according to the present invention is generally shown 200. The block diagram 200 has a slot entry table 202 showing eight slots or arbitration slices 204-218 in order to be comparable to the circuit shown FIG. 1. It should be noted, however, that in PCI Express fabric, 32 to 256 slots would actually be used. Each of the slots 204-218 will store the address of one of the channels that is being arbitrated which will be selected by the system 200. The blocks do not store the data to be sent out, only the address of the queue holding the data. The number of bits stored by each slot 204-218 is determined by the number of channels in the system, where each channel has its separate queue for data to be sent out on that channel. The number of queues is not related to the number of slots in the table. The number of queues equals the number of channels to be arbitrated. The number of slots determines the resolution of the system. For example, with only 8 slots in the table 202, the time resolution is 12.5%. In contrast, a table having 256 slots has a resolution of 1/256 or about 0.4%. If one desired to assign 10% of the time slots to channel Ø, for example, an 8 slot table is inadequate, but there is no problem with a 256 slot table. Each of the blocks 204-218 receives the empty flags from the respective queues on line 224. As shown here, three empty flags are coupled to the slots, which means there are three queues in the system. The highest priority address of the highest priority channel or queue is stored in slot 204. After a successful transmission from that channel, the table 202 will be shifted via line 220 so that the next highest priority channel, the address of which is stored in slot 206, will move to block 204 and become the new highest priority channel. As described above, it is possible that the address of the queue to be selected in both slots 204 and 206 are the same, so that particular channel is weighted heavier than other channels, for example.

However, in the system shown in FIG. 2 generally as 200, if the flag on line 224 corresponding to the address of the queue stored in slot 204 is the same, then when the channel is to be selected for data transmission, the address stored in slot 204 will be bypassed and the next address, stored in slot 206 will be utilized. Likewise, if the flag indicates that the queue which is addressed by the address stored in slot 206 is empty, the next available queue, that is the one whose address is stored in slot 208 will be utilized. In this system, no time is lost in selecting for each time slot which address (queue) has data to be sent out because the bypassing of a particular entry in the table 202 is accomplished by means of combinational logic, and thus the bypass of the empty queues can be accomplished within a single clock cycle. Once data has been sent out, even if the data corresponds to the address stored in slot 210, the table will be rotated by a single position, so that the address stored in slot 206 will now be the first slot (slot 204) that has the highest priority. In another embodiment, once the data has been sent out, the slot from which the address was sent out will be rotated to the end of the table. All slots from that slot to the end of the table will then be rotated one slot to the left in the table. This preserves the relative priority of the empty slots. That is, if a slot that was bypassed is no longer empty, it will be considered for the next time slot.

Figure 3:
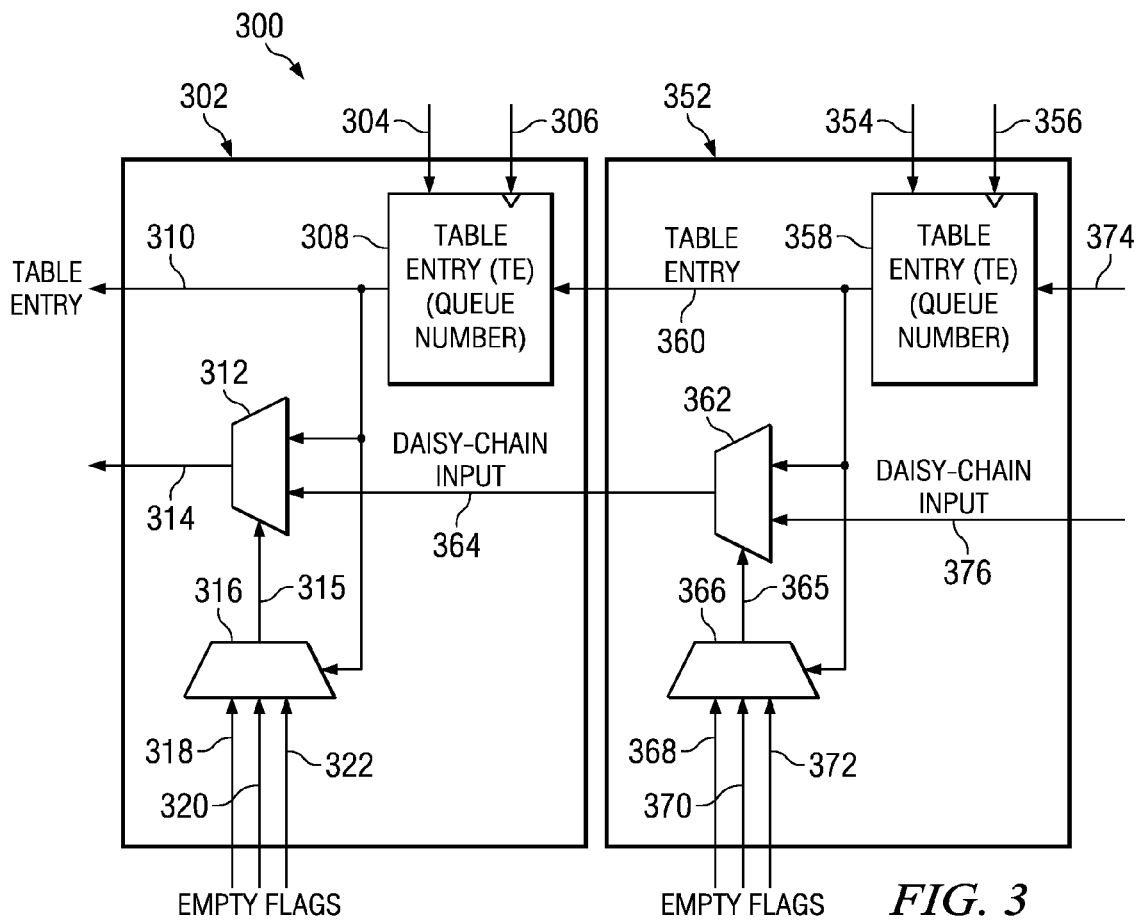
FIG. 3 is a block diagram of a weighted round-robin arbitrator in accordance with the present invention.

FIG. 3 shows a detailed implementation of the invention illustrated in FIG. 2 generally as 300. The circuit 300 illustrates the circuitry for two contiguous blocks of the table, each representing a specific time slot. One such block is required for each slot in the table. The circuits 302, 352 are identical in construction and are designed to be modular so that the table can be configured from the number of such circuits required to make a table of the desired length. That is, for PCI Express implementation, typically 32 to 256 slots would be made available in the table. Therefore, 32 to 256 of the circuits 302 or 352 are required.

Each block has a table entry TE 308, 358 which contains the address of the queue to be selected when that slot is active. Each table entry 308, 358 receives a POP signal on lines 304, 354 and a clock signal on lines 306, 356. Each block 302, 352 contains a multiplexer 312, 362 which receives the output of the table entry, and a daisy-chain input from the preceding block. The output of the multiplexer 312 on line 314, 364 is fed to the next stage. If the block, such as 302, is the first stage in the chain, the output is fed to the multiplexer that selects the queue to send out the data. The daisy-chain output of the last block in the chain (such as block 352) has its daisy-chain input tied to an arbitrary logic level (the diagram show a loop back from the first block). Each of the multiplexers 312, 362 receives the output of a multiplexer 316, 366. Empty flags 318, 320, 322 or 368, 370, 372 from the queues of the respective channels are input to the multiplexers 316, 366 respectively. The control input of the multiplexer 316, 366 is coupled to the TE outputs 310, 360 respectively. The TE output first stage 302 is fed back to the equivalent of 374 of the highest number stage (not shown) as shown by line 220 in FIG. 2.

In operation, the output signal TE on line 310 is used to select one of the empty flags 318, 320, 322 input to multiplexer 316. If that empty flag indicates that the queue selected by the table entry on line 310 is empty, the signal 315 applied to multiplexer 312 will select the daisy-chain input and the queue corresponding to the table entry 310 is bypassed. If the empty flag applied to multiplexer 312 indicates that data is ready to be sent out from that queue the signal 315 applied to multiplexer 312 will select the queue number on line 310 which will be output on line 314 and applied to the queue multiplexer (not shown in FIG. 3) to select the appropriate queue for data to be sent out.

If the daisy-chain input of multiplexer 312 has been selected, then the output of multiplexer 362 on line 364 will be chosen. The output of that multiplexer can be the TE value on line 360 or, if that value corresponds to a queue which has no data to be sent out, it will be the daisy-chain input 376 to multiplexer 362. In this matter, each stage which addresses a queue having no data to be sent out will be bypassed, all within a single clock cycle. Thus, the slot will automatically go to the first queue which has data to be sent out. Once data has successful been sent out from the queue, the table is shifted so that the TE value in block 358 is transferred to block 308 and all the other blocks are transferred to the block to the left (not shown). On the next cycle priority will be give to the data which is now contained in table entry TE 308.

Figure 4:
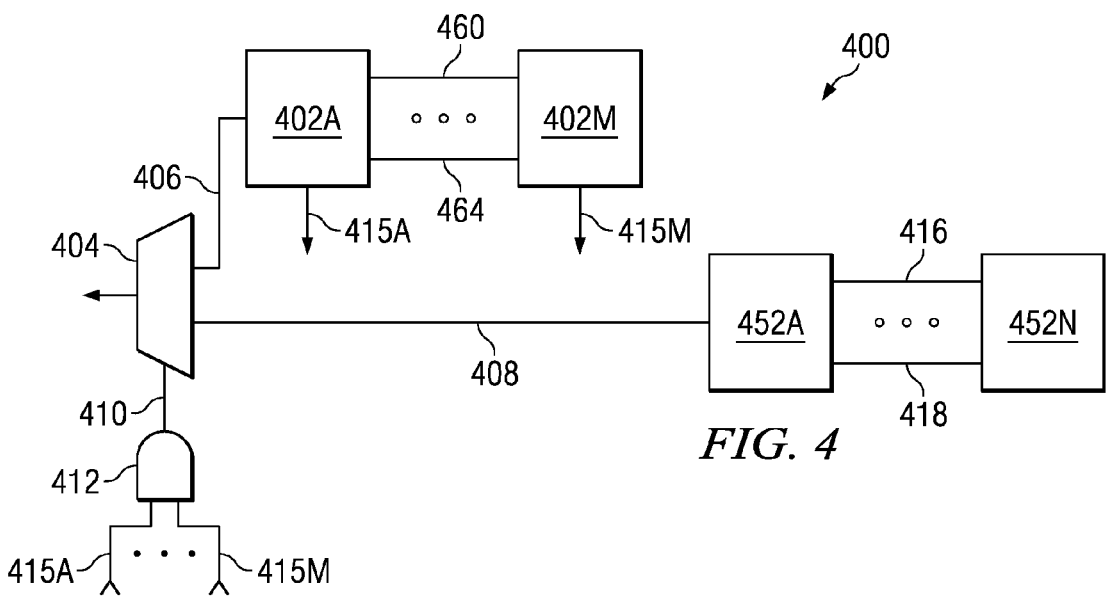
FIG. 4 is a block diagram of the system of FIG. 3 modified for use with a long table.

Thus, if there were 256 slots utilized and thus 256 entries into the table 202, and only a single block, the lowest priority block having been assigned a single slot 255, the system would bypass all of the preceding blocks which refer to queues which have no data to be sent out, and choose the block that does have data to be sent out, thus rapidly speeding up the transmission of this data. A technique for avoiding long time delays which could be generated by such a long table is discussed below in connection with FIG. 4.

In a long table, the ripple effect of going through each multiplexer of each stage such as stages 302 and 352 could be excessive. In order to avoid this problem a circuit layout shown generally 400 is utilized. In this embodiment, the table is broken into two segments 402A-402M and 452A-452N, although any number of segments can be utilized. The number of slots within the table is represented by the numbers A-M and A-N where M or N can be equal to any integer and the number of segments in the first section of table 402A-402M may not be equal to the number of segments in the table sections 452A-452N. Each of the segments 402A-402M generates a signal 415 which is equivalent to the signal 315 generated in block 302 of FIG. 3. These are the enable signals for the multiplexer 312 shown in FIG. 3. If all the signals indicate that all the multiplexers in the blocks 402A-402M are to be bypassed, then there is no need for the ripple of all the multiplexers to occur. The signals 415A-415M are applied as inputs AND gate 412 having an output on line 410 which is coupled to the control input of multiplexer 404. The output from the first block 402A is coupled via line 406 to the multiplexer 404. In addition, the output from the first block 452A of the second segment is coupled via line 408 to the second input of multiplexer 404. If all of the signals 415A-415M indicate that all the blocks 402A-442M are to be bypassed, then the multiplexer 404 will be activated to select the input 408 rather than the input 406 and thus reduce the time to reach an active slot. This circuitry is similar to the carry-look-ahead circuitry for an adder.

One major advantage of the present invention is that it is modular. Thus, the circuit required to generate the queue addresses requires the same number of identical blocks as the number of slots. The modular block 302, 252 or 402, 452 do not require circuit changes with changes in the length of the slot entry table. This reduces the design cost for systems which employ this weighted round-robin arbitrator and speeds up the system design.

While the invention has been shown and described with reference to preferred embodiments thereof, it is well understood by those skilled in the art that various changes and modifications can be made in the invention without departing from the spirit and scope of the invention as defined by the appended claims. For example, the weighted round-robin arbitrator of the present invention can also be used for any situation where resource is shared among more than one potential users.

The invention claimed is:

1. In a weighted round-robin arbitrator comprising: a plurality of data queues; the improvement comprising:
   an arbitration table comprising a plurality of entries, each entry representing a time slot for the transmission of one data packet from a selected one of the plurality of data queues;
   an arbitration logic circuit, for each of the plurality of entries in the arbitration table, comprising:
      a first multiplexer receiving an output from a first table entry and an output from a second table entry in the arbitration table;
      a second multiplexer receiving empty flags from each of the data queues, the flags indicating that there is no data to be sent from that queue, an output of the second multiplexer being coupled to a control input of the first multiplexer whereby the first table entry value is output from the first multiplexer if the corresponding queue has data to be sent out and the second table entry value is sent out from the first multiplexer if the queue corresponding to that table entry has data to be sent out and the queue corresponding to the first entry has no data to be sent out.

2. The weighted round-robin arbitrator of claim 1 wherein the second table entry is in juxtaposition to the first table entry.

3. The weighted round-robin arbitrator of claim 1 wherein the number of entries in the arbitration table is between 32 and 256.

4. The weighted round-robin arbitrator of claim 1 wherein if no data is present in the data queue corresponding to the second table entry, data is selected from the next entry in the table which corresponds to a data queue which has data to be sent out.

5. The weighted round-robin arbitrator of claim 1 wherein the table entries are subdivided into multiple subsections, each subsection being processed separately.

6. The weighted round-robin arbitrator of claim 5 wherein a carry-look-ahead circuit is used to select the next table entry.

7. The weighted round-robin arbitrator of claim 6 wherein empty flags of each subsection are ANDed together to generate a subsection empty signal and wherein the subsection empty signal is used to route the second input to the first multiplexer.

8. The weighted round-robin arbitrator of claim 1 wherein the entries in the table are rotated in position after each time slot.

9. The weighted round-robin arbitrator of claim 1 wherein data is sent out from one of the date queues during each clock cycle.

10. A method of weighted round-robin arbitration comprising:
    determining if a data queue corresponding to a first table entry in an arbitration table has data to be sent out;
    operating a first logic circuit to send out the data in the first entry if data to be sent out is present;
    if no data to be sent out is present in the data queue corresponding to the first entry, determined if data in a data queue corresponding to a second entry is ready to be sent out;
    operating a second logic circuit to send out the data in the second entry if data to be sent out is present.

11. The method of claim 10 further comprising if no data is present in the queue corresponding to the second entry, operating a third logic circuit to send out data from the next entry in the table which has a corresponding queue that has data to be sent out.

12. The method of claim 10 wherein the table entries are subdivided into multiple subsections, each subsection being processed separately.

13. The method of claim 12 wherein a carry-look-ahead circuit is used to select the next table entry.

14. The method of claim 13 wherein the first logic circuit is a first multiplexer and wherein the empty flags of each subsection are ANDed together to generate a subsection empty signal and wherein the subsection empty signal is used to route a second input to the first multiplexer.

15. The method of claim 11 wherein the table entries are subdivided into multiple subsections, each subsection being processed separately.

16. The method of claim 11 wherein a carry-look-ahead circuit is used to select the next table entry.

17. The method of claim 10 wherein a carry-look-ahead circuit is used to select the next table entry.

18. The method of claim 10 wherein the first logic circuit is a first multiplexer and wherein the empty flags of each subsection are ANDed together to generate a subsection empty signal and wherein the subsection empty signal is used to route a second input to the first multiplexer.

19. The method of claim 11 wherein the first logic circuit is a first multiplexer and wherein the empty flags of each subsection are ANDed together to generate a subsection empty signal and wherein the subsection empty signal is used to route a second input to the first multiplexer.

20. The method of claim 12 wherein the first logic circuit is a first multiplexer and wherein the empty flags of each subsection are ANDed together to generate a subsection empty signal and wherein the subsection empty signal is used to route a second input to the first multiplexer.

21. The weighted round-robin arbitrator of claim 1 wherein the table entry that is sent out is rotated to the end of the table and all slots between this slot and the end of the table are rotated by one position.

* * * * *